United States Patent [19]
Sharman

[11] Patent Number: 5,686,210
[45] Date of Patent: Nov. 11, 1997

[54] IDENTIFICATION OF IMAGE-FORMING MATERIAL TYPE

[75] Inventor: Richard Arthur Sharman, Bedfordshire, United Kingdom

[73] Assignee: Eastman Kodak Company, Rochester, N.Y.

[21] Appl. No.: 525,683

[22] PCT Filed: Jan. 23, 1995

[86] PCT No.: PCT/EP95/00235

§ 371 Date: Sep. 21, 1995

§ 102(e) Date: Sep. 21, 1995

[87] PCT Pub. No.: WO95/20183

PCT Pub. Date: Jul. 27, 1995

[30] Foreign Application Priority Data

Jan. 25, 1994 [GB] United Kingdom .................. 9401392

[51] Int. Cl.$^6$ .................. G03C 5/02; G01J 3/40; G03B 27/73
[52] U.S. Cl. .................. 430/30; 356/404; 356/443; 356/444
[58] Field of Search .................. 430/30; 356/404, 356/443, 444

[56] References Cited

U.S. PATENT DOCUMENTS

| | | | |
|---|---|---|---|
| 4,150,894 | 4/1979 | Meyer et al. | 355/38 |
| 4,829,371 | 5/1989 | Hiramatsu et al. | 358/80 |
| 4,830,501 | 5/1989 | Terashita | 356/402 |
| 4,917,500 | 4/1990 | Lugos | 356/406 |
| 5,053,808 | 10/1991 | Takagi | 355/38 |

FOREIGN PATENT DOCUMENTS

| | | | |
|---|---|---|---|
| 0319769 | 6/1989 | European Pat. Off. | G01J 3/46 |
| 41 20 749 | 2/1992 | Germany | G01J 3/50 |

OTHER PUBLICATIONS

Graebe, C.M., Prof. Printer, vol. 20, No. 1 (1976), pp. 2–3, Jan. 1976.

Primary Examiner—Mark F. Huff
Attorney, Agent, or Firm—Raymond L. Owens

[57] ABSTRACT

Described herein is a method and apparatus for identifying image-forming material type, particularly photographic material types. The method comprises illuminating a sample of the material at a plurality of wavelengths and measuring the density at each of these wavelengths. The set of density values obtained are then used to determine the slope of the cyan dye curve between the magenta and cyan peaks. This slope can then be compared to data to identify the material.

21 Claims, 9 Drawing Sheets

IDENTIFICATION OF IMAGE-FORMING MATERIAL TYPE

This application is a 371 of PCT/EP95/00235 filed Jan. 23, 1995, now publication no. WO 95/20183.

FIELD OF THE INVENTION

The present invention relates to the identification of image-forming material type and is more particularly, although not exclusively, concerned with the identification of photographic transparency film types. The present invention is particularly useful in the identification of the film type of a mounted transparency.

BACKGROUND OF THE INVENTION

Photographic materials such as transparencies are normally mounted after processing so that they can be easily handled and positioned for viewing in a projector or another type of viewer. The mount is chosen so that only the image area is visible on inspection, and as a result, any identification present on the transparency prior to mounting is hidden by the mount itself.

In some instances, it may be necessary to determine the particular type of transparency or other type of photographic material. Such a situation arises where photographic images stored on conventional photographic materials are to be transferred to some other form, for example, a digital form such as video or photo CD (compact disc). In these instances, the image is scanned to break it down into a number of discrete pixels. These pixels are then electronically processed to correct for colour or sharpness deficiencies and then stored in the other form, for example, on a photo CD.

However, in order to carry out the colour correction process, the material type on which the image is initially stored needs to be known. When scanning negatives, it is a simple matter to examine the edge of the film strip for the film type codes. However, for transparencies, it is not possible to see the edge of the film without removing each transparency from its associated mount as mentioned above. Often, it is not easy to remove the transparency from its mount, and once removed, there is no guarantee that the single-frame of the initial strip will carry any identification.

Transparency materials tend to fall into two groups, namely, Kodachrome, and Ektachrome types. Both Kodachrome and Ektachrome are registered trade marks of Eastman Kodak Company.

It is known to identify transparency materials, for example, graphics arts materials, by measuring the density of the cyan dye on the long wavelength side using a Wratten 70 filter and a standard AA red filter. Such a method is described in *Professional Printer*, Volume 20, No. 1, by C Graebe. In this method, two readings are taken using the two filters and the ratio of the reading is then used to identify the film type.

GB-A-1 553 199 discloses an exposure control system for photographic colour printers and operates in a similar way to the method described above. However, in this case, the method is linked into the control system of a printer to control exposure.

Problem to be solved by the Invention

The method described above is not entirely satisfactory when distinguishing between the current Kodachrome and the Ektachrome types of transparencies.

SUMMARY OF THE INVENTION

It is therefore an object of the present invention to provide a method and apparatus for distinguishing between types of photographic materials, and in particular between Kodachrome and the Ektachrome types of transparencies.

In accordance with one aspect of the present invention, there is provided a method of identifying image-forming materials, the method comprising the steps of:

illuminating a sample of image-forming material with a radiation source operating at a plurality of wavelengths;

measuring a parameter indicative of the sample density at a plurality of points on a particular dye absorbency curve for the material;

calculating the ratios of the measured adjacent sample parameters from that dye absorbency curve; and comparing the calculated ratios with reference data to determine the type of material.

In accordance with another aspect of the present invention, there is provided apparatus for identifying image-forming materials from a sample, the apparatus comprising:

illumination means for illuminating the sample at a plurality of wavelengths;

detector means for detecting radiation received from the sample and providing an output signal indicative of the sample density; and processing means for processing the output signal indicative of the sample density to provide an indication of the type of material.

Advantageous Effect of the Invention

Advantageously, a film type can be automatically identified. Furthermore, if the material is a transparency, there is no need to remove it from its mount for identification.

Moreover, better discrimination is provided when distinguishing between Kodachrome and the Ektachrome types of transparencies than is possible with currently available techniques.

Multiple detectors may also be used to provide better discrimination for highly coloured samples by measuring other portions of the transparency which may not be highly coloured.

BRIEF DESCRIPTION OF THE DRAWINGS

For a better understanding of the present invention, reference will now be made, by way of example only, to the accompanying drawings in which.

DETAILED DESCRIPTION OF THE INVENTION

The method of the present invention will initially be described with reference to the identification of transparency materials. However, it is to be noted that this method is not solely limited to use with such materials.

In general, the method of the present invention utilises a densitometer, measuring at a number of wavelengths in the visible spectrum, to detect differences between the dyes used in Kodachrome and the Ektachrome types of transparency materials.

The dyes used in transparency materials vary in the wavelength of their peak absorbency and in the shapes of their absorbency curves. The main difference between the two families occurs in the shape and wavelength of the cyan dye absorbency curve.

Figure 1:
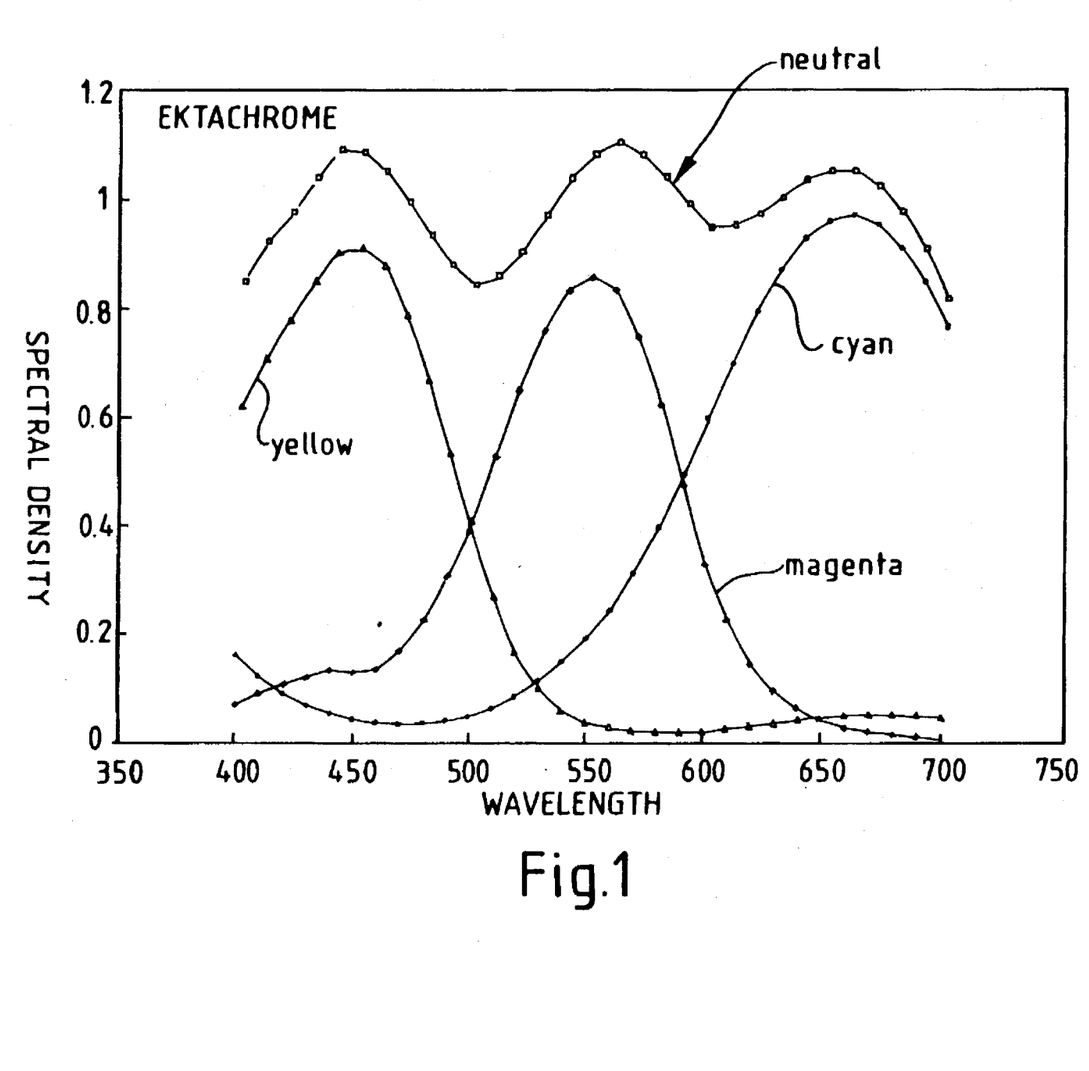
FIGS. 1 and 2 are respectively dye absorbency curves for Ektachrome and Kodachrome transparency materials.
Figure 2:
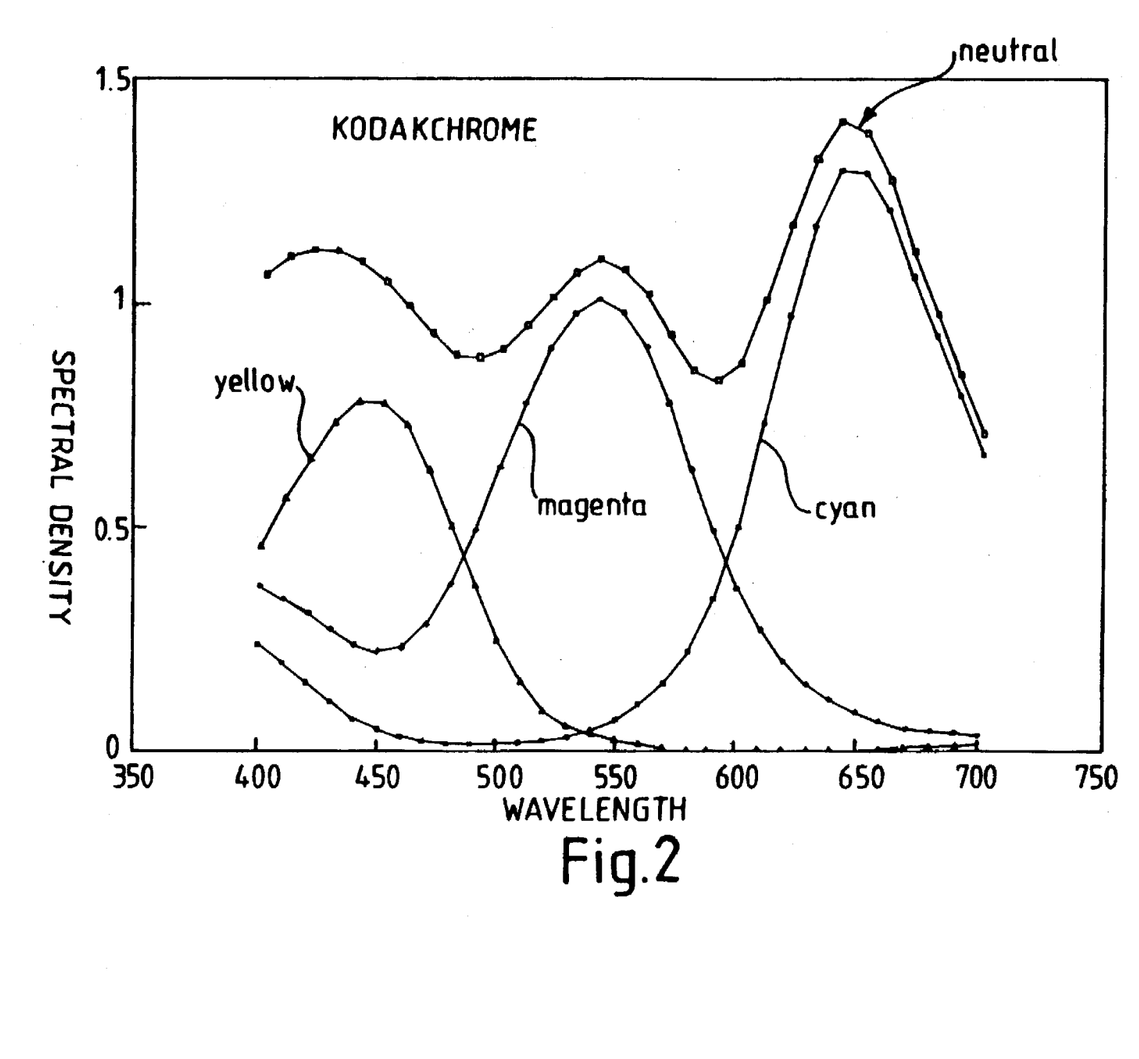

The Graebe method, discussed above, utilises differences on the long wave side of the peak of the cyan dye absorbency curve, whereas the present invention utilises differences on the short wave or green side of the peak of the cyan dye absorbency curve. The curves for the Ektachrome types and Kodachrome are shown in FIGS. 1 and 2 respectively. The dye absorbency curves are shown for yellow, magenta, cyan and the neutral (which is a sum of the three curves).

Using density measurements at and between the peaks of the cyan and magenta dyes the slope of the cyan dye curve between the peaks can be calculated. The measured slope of the cyan dye can then be compared to the film data and an assessment of film type made.

In the present invention, examination of the cyan dye slope is carried out by measuring the large area density of the transparency at five visible wavelengths, namely, 555 nm, 585 nm, 605 nm, 630 nm and 660 nm. The 555 nm source is close to the magenta dye peak and the 660 nm source is close to the cyan dye peak. The densities measured at the other three wavelengths are used to give a measure of the cyan dye between the magenta and cyan dye peaks.

Figure 3:
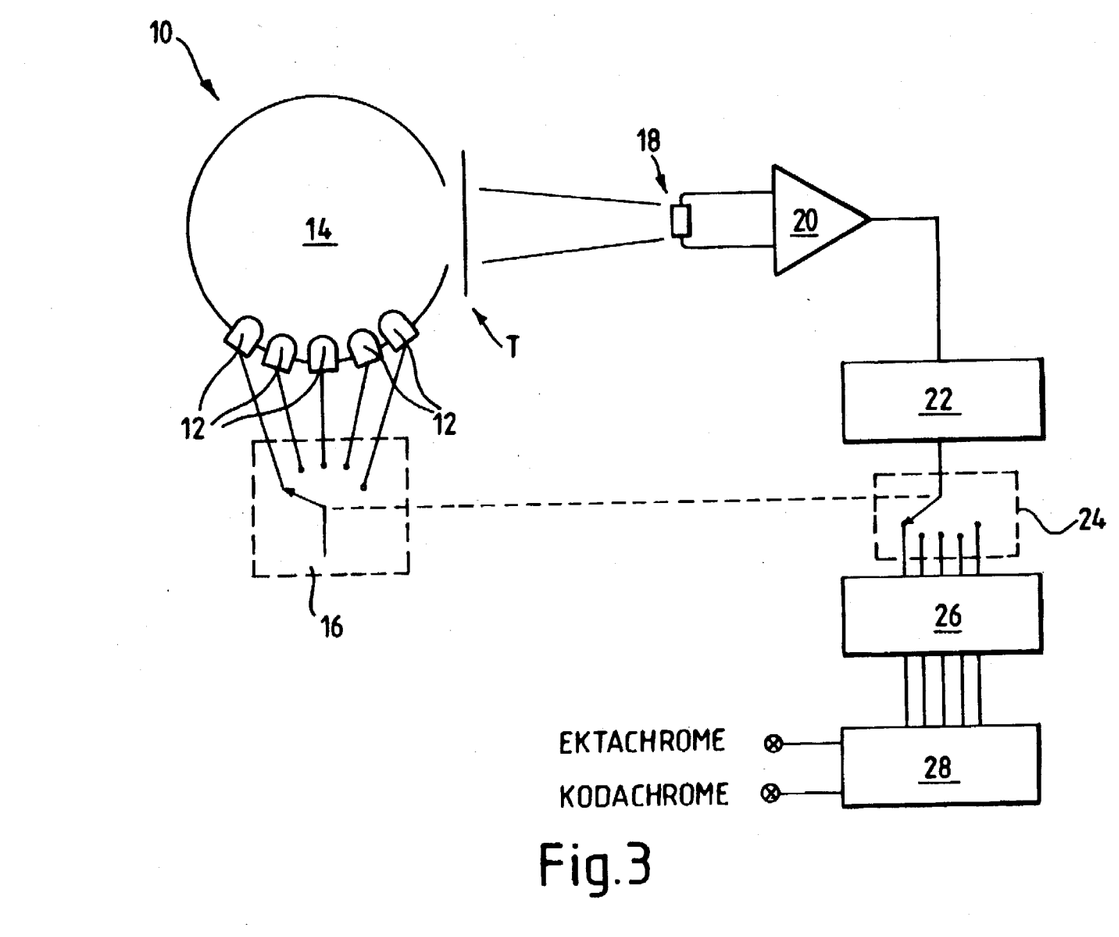
FIG. 3 illustrates one embodiment of apparatus constructed in accordance with the present invention.

Apparatus in accordance with one embodiment of the present invention is shown in FIG. 3. Here, an illumination source 10 comprises five light emitting diodes (LEDs) 12 arranged in an integrating sphere 14. Each of the diodes provides illumination at respective ones of the following wavelengths: 555 nm, 585 nm, 605 nm, 630 nm and 660 nm. Each diode 12 is connected to a switching arrangement 16 which allows each diode 12 to be switched in turn to illuminate a transparency being tested. As mentioned above, five density readings are taken so that a determination of the type of transparency family can be made.

Light from the integrating sphere 14 passes through a transparency T under test. (By the term 'transparency' is meant a mounted slide having an image area (not shown) through which light is directed.) Light passing through the transparency T is collected and focused on to a photodiode 18 which provides an output signal proportional to the logarithm of the light entering the photodiode 18 and hence the density of the transparency T.

The output signal then passes to an amplifier 20 for amplification to provide a voltage signal. The voltage signal is then digitised by an analogue-to-digital (A/D) converter 22.

The output from the A/D converter 22 passes through a second switch arrangement 24 prior to being stored in a store 26.

Switch arrangements 16, 24 are synchronised so that light of only one wavelength is processed and stored at any one time. Synchronisation of the switch arrangements 16, 24 can be achieved by any suitable control means (not shown).

As a result, switch arrangements 16, 24 are switched at the same time so that, for a LED 12 of particular colour, the density value for the transparency T is stored in a predetermined location in the store 26.

A processor 28 receives data from the store 26 for each of the illumination wavelengths and calculates the value of the cyan density for each of these wavelengths.

The ratios of the adjacent cyan densities are then calculated and compared to theoretical values and a decision is made as to whether the transparency T being tested is Kodachrome or from the Ektachrome types of transparencies.

The control means may comprise a computer which also carries out the functions of the switch arrangements 16, 24, the store 26 and the processor 28. The program in the computer can then process the data to make the appropriate decision. The result may be displayed for an operator in any suitable manner or used as an input to a scanner and used in signal processing. In this way, the computer controls both the apparatus to obtain the required measurements and the data processing required to produce the desired result.

Figure 4:
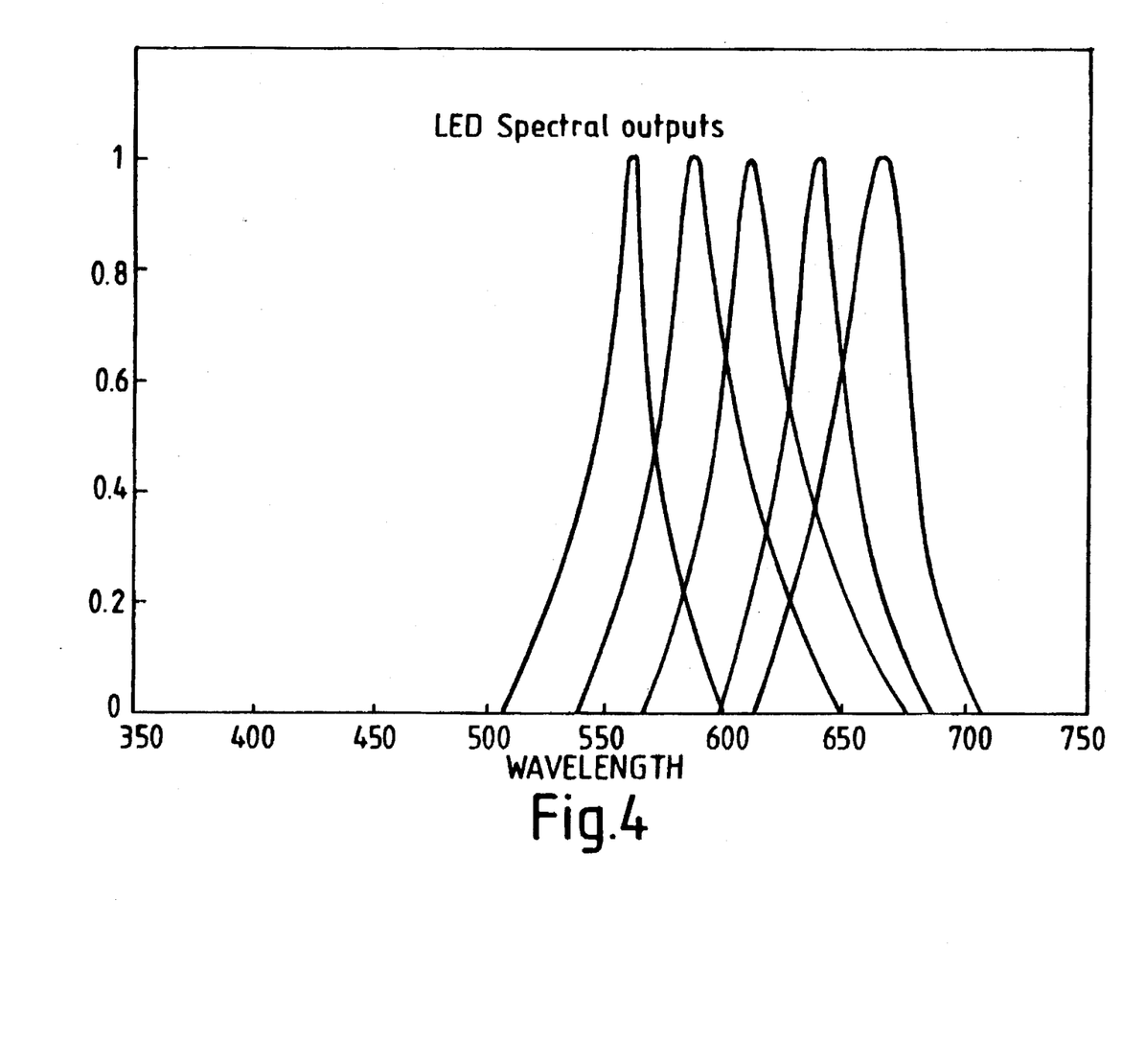
FIG. 4 illustrates the overlap of the spectral outputs from LEDs.

Correction may need to be applied to compensate for spectral overlap of the outputs from the LEDs 12. This is carried out in the processor 28 by using a linear mask correction stage as is well known in the art (see for example, BBC Research Department Report No. T-175, 1965, "Use of a linear matrix to modify colour analysis characteristics of a colour camera" by A H Jones). FIG. 4 illustrates the spectral outputs which may be obtained from five LEDs.

However, if cost is not of importance, a more elaborate system could be used comprising a lamp and dichroic filters to replace the LEDs and then there would be no need for the linear mask correction stage.

A first order correction to the dye peak density values may be made due to the unwanted absorbencies of the dyes in the film. This is achieved by subtracting a proportion of the 555 nm density value from the 660 nm density value and vice versa to give a more accurate estimation of the magenta and cyan dye peak densities. Different algorithms may be used for Kodachrome and the Ektachrome type materials for this correction and examples are given below:

Ektachrome:

green: $555_c = 555_m - 0.2 \times 660_m$ red: $660_c = 660_m - 0.03 \times 555_m$ where the subscripts 'c' and 'm' refer to corrected and measured values respectively.

Kodachrome:

green: $555_c = 555_m - 0.03 \times 660_m$ red: $660_c = 660_m - 0.07 \times 555_m$ These algorithms are determined directly from the dye absorbency curves as shown in FIGS. 1 and 2.

In a simple system, a single algorithm may suffice for calculating the values for Kodachrome and the Ektachrome types.

It may be necessary to incorporate a protection stage to deal with highly coloured samples where the calculation of the cyan dye density may not be accurate. This will occur with saturated reds where the level of cyan dye is very low compared to the adjacent magenta dye, and a new sample may be required or the Graebe method discussed above may be additionally implemented. In the protection stage, the ratio of the cyan to magenta peak densities are determined and a limit applied. If the ratio is above this limit, the sample is rejected. Generally speaking if magenta>k×cyan, then the sample is rejected (where k is a constant).

The cyan density calculation is carried out using the corrected value of the magenta dye—a proportion of which is subtracted from the intermediate density measurements corresponding to the dye sets shown in FIGS. 1 and 2. An example set of the algorithms which may be used for the Ektachrome types and Kodachrome are given below:

Ektachrome:

$585_c = 585_m - 0.52 \times 555_c$
$605_c = 605_m - 0.33 \times 555_c$
$630_c = 630_m - 0.12 \times 555_c$ Kodachrome:

$585_c = 585_m - 0.57 \times 555_c$
$605_c = 605_m - 0.36 \times 555_c$
$630_c = 630_m - 0.17 \times 555_c$ where subscripts 'c' and 'm' are the corrected and measured values respectively as defined previously.

As before, the algorithms were determined directly from the dye absorbency curves as discussed above.

The various ratios of the adjacent measured densities are compared to see how closely they match the ratios of the adjacent densities calculated from the dye curves shown in FIGS. 1 and 2, the set with the closest match identifying the film type.

The matching can be simplified by applying a threshold value above which the material is identified as being Kodachrome.

Figure 5:
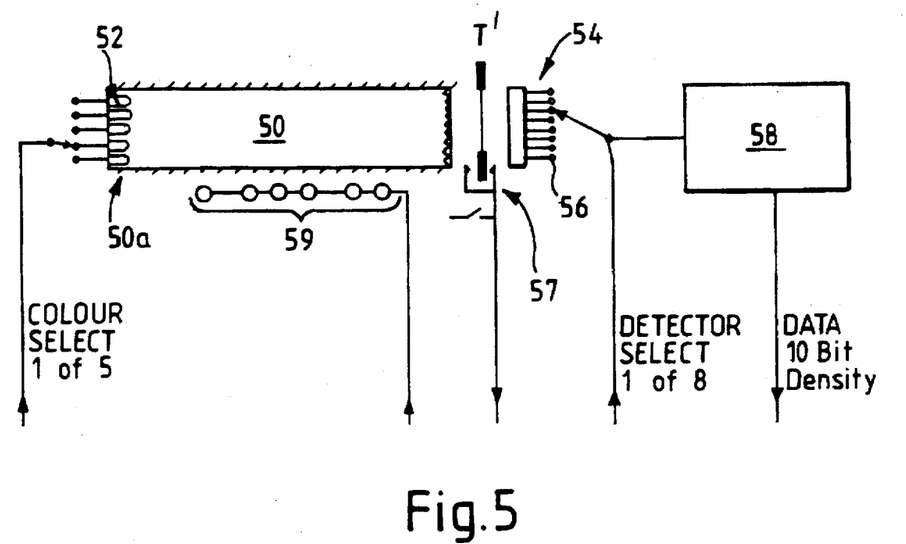
FIG. 5 illustrates a second embodiment of apparatus constructed in accordance with the present invention.

Discrimination of the apparatus in accordance with the present invention can be improved by using multiple detectors instead of a single detector as described above. This is particularly important where the transparency contains large coloured areas. FIG. 5 illustrates another embodiment of the apparatus in accordance with the present invention in which a multiple detector array is utilised.

In FIG. 5, illumination is provided by a mirror box 50 which has five LEDs 52 mounted at one end 50a of the box 50. Each of the LEDs 52 produces radiation at a respective one of the following wavelengths: 555 nm, 585 nm, 605 nm, 650 nm and 690 nm. An additional infrared-emitting LED (not shown) is also used. This infrared-emitting LED is useful for the detection of non-dye materials, for example, black-and-white materials. The radiation produced by the infrared-emitting LED is at a wavelength of 935 nm.

The mirror box arrangement of this embodiment can provide a larger area of brighter illumination than the integrating sphere arrangement described above for a given physical size and is the preferred arrangement when utilising multiple detectors. The larger area of illumination becomes necessary as an array of detectors is to be used.

As before light from the mirror box 50 passes through a transparency T' and on to a detector array 54 comprising eight detectors 56. Density measurements are collected from each detector 56 in the detector array 54 in turn and passed to an A/D converter 58 for storage and processing as described above in relation to a single detector. Naturally, the algorithms used to carry out the corrections and processing are adjusted in accordance with the different wavelengths utilised to illuminate the sample.

A slide gate sensor 57 is positioned so that it can easily be determined if a transparency or slide has been fully inserted into the gate, that is, the transparency or slide is correctly located between the detectors 56 and the mirror box 50.

An array 59 of indicators may be included which display the result of the measurement taken, the array receiving appropriate signals from the processor (not shown).

The detectors 56 in the detector array 54 may be uniformly arranged over the image area. However, if only a limited number of detectors are used, these will need to be placed so as to provide the optimum output.

Generally, the main subject matter of an image is around or near the centre of the frame and systems for determining exposure control sample the densities at the centre of the image. In this particular application, it is a requirement to obtain a sample which has large amounts of cyan dye, that is, a sample which is not red. Subjects at the centre of an image may be highly coloured and it is preferable for the present invention to concentrate the detector array 54 off-centre so that more neutral image areas are sampled, for example, blue sky or green grass, both of which would provide suitable samples for measurement of the cyan dye density.

Figure 6:
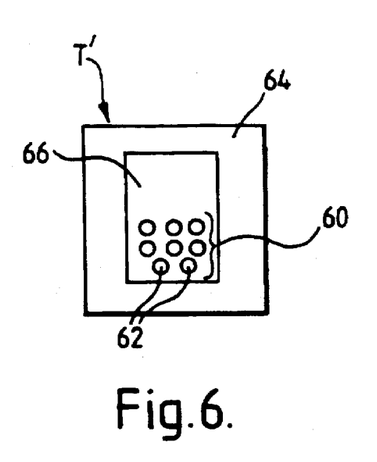
FIG. 6 is a schematic arrangement of a detector array for use in the embodiment of FIG. 5.

FIG. 6 illustrates one detector array arrangement 60 where eight detectors 62 are positioned off-centre. A transparency T' is shown having a mount area 64 and an image area 66, the detectors 62 being aligned with the image area 66. The signals received by the processor (not shown) from each detector 62 in the detector array 60 are processed as described above in relation to the single detector arrangement. It will readily be seen that there are now eight sets of readings which can be used to determine the type of transparency material being tested.

Figure 7:
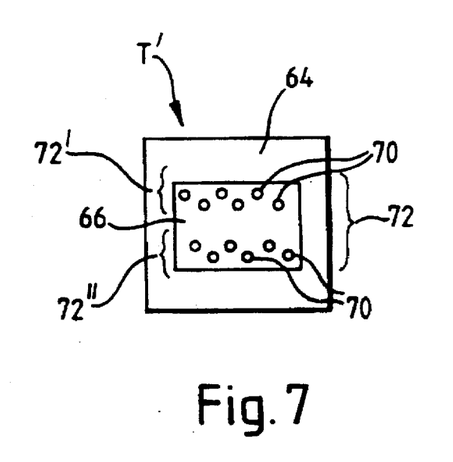
FIG. 7 is a schematic arrangement of a further detector array which can be used in the embodiment of FIG. 5.

Naturally, any other suitable arrangement of the detectors can be used. Furthermore, it is not necessary to have eight detectors as described above, and it may be more practical to have a greater or a lesser number according to the particular arrangement of the apparatus. A preferred detector array arrangement is shown in FIG. 7. Parts which have been described previously are referenced the same.

In FIG. 7, a transparency T' is shown which has a mount area 64 and an image area 66. Twelve detectors 70 are utilised in the detector array 72. As shown, the array 72 is effectively divided into two portions, 72' and 72", and each detector 70 is arranged so that it is offset from its adjacent detectors in its associated portion as well as from the other detectors in the other portion. This provides twelve readings which can be used to determine the type of material being tested.

It will be readily understood that, although more detectors are being employed, not all readings will be useful as some, if not all, of the detectors may coincide with a highly coloured area of the transparency T'.

It may be possible to move the transparency relative to the apparatus so that other regions of the transparency can be tested if a predetermined number of the readings obtained from the detectors indicate that the transparency is highly coloured.

However, where the entire image is highly coloured, it may not be possible to determined the film type. In such cases, a default output may be used, for example, an indication that the material is one of the Ektachrome types.

The present invention may be used with the Graebe method to provide a more positive identification—particularly for highly coloured samples, for example using the 690 nm light source described above.

By using other wavelengths in the visible and near infrared, other film types could be identified.

The method of the present invention can also be used for determining different types of print material, for example, images formed using Ektacolor (registered trade mark of Eastman Kodak Company)—conventional photographic paper, thermal printing or laser printing. In such cases, it will be readily understood that the appropriate dye densities are determined using reflection techniques rather than transmission techniques.

Three main technologies are used for producing high quality continuous tone colour images. These are:

1) photographic using Ektacolor or Ektachrome paper (both Ektacolor and Ektachrome are registered trade marks of Eastman Kodak Company);

2) thermal for electronic imaging; and 3) printing with inks as in magazines.

Colour ink jet printers can also produce good results for 'computer' derived images but it does not have the grey scale capability of the three technologies listed above.

Images produced by these technologies have distinct cyan dye or pigment characteristics, and these differences can be used to differentiate between the different types of print materials. Use is also made of an infrared source to detect the carbon-based black printing inks in magazine prints. These inks have a density in the infrared whereas organic coloured dyes have very little infrared density. The infrared source can also be used to detect other black-and-white images based on silver halide.

Figure 8:
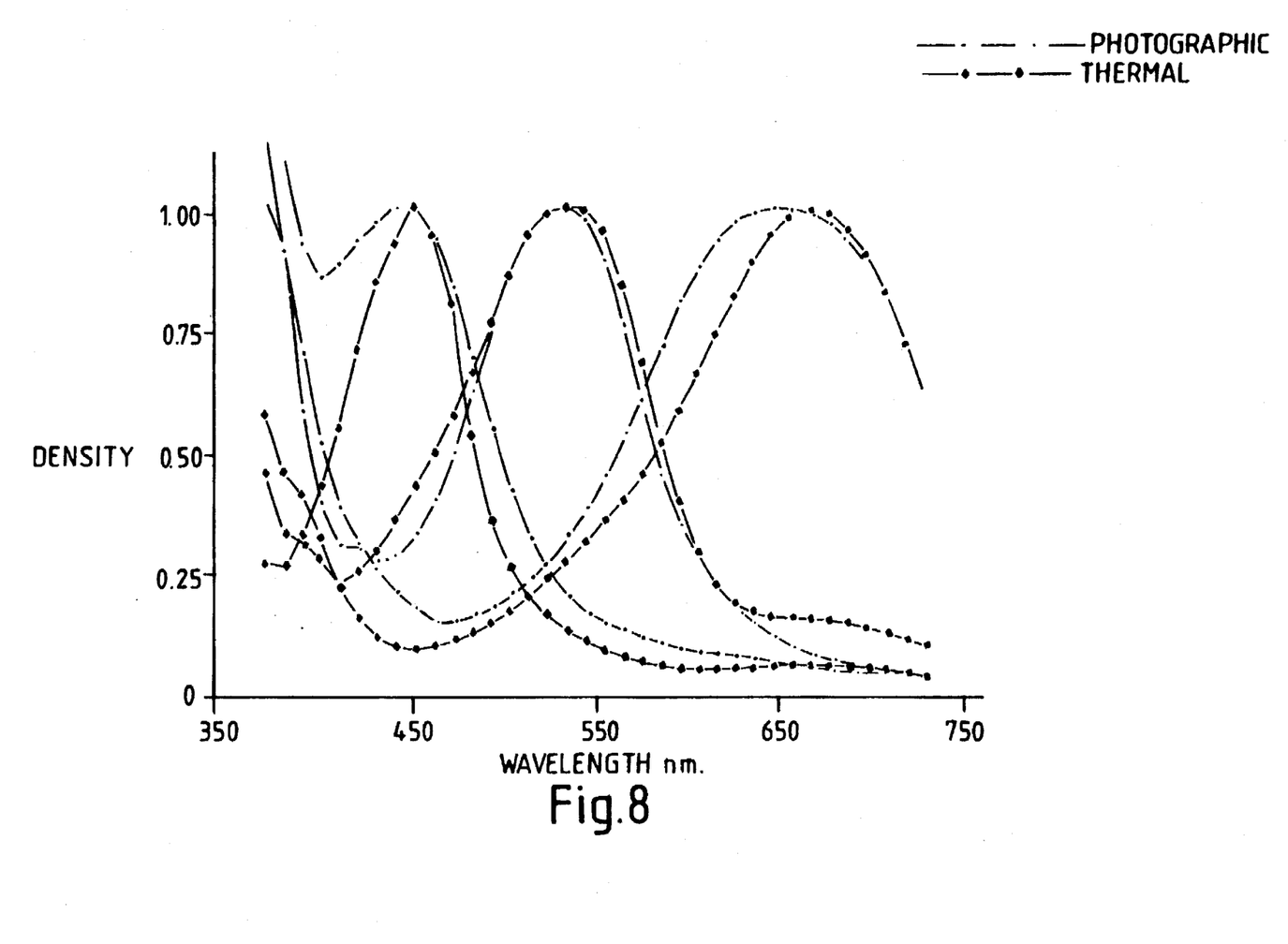
FIG. 8 illustrates dye absorbency curves for photographic and thermal dye sets.
Figure 9:
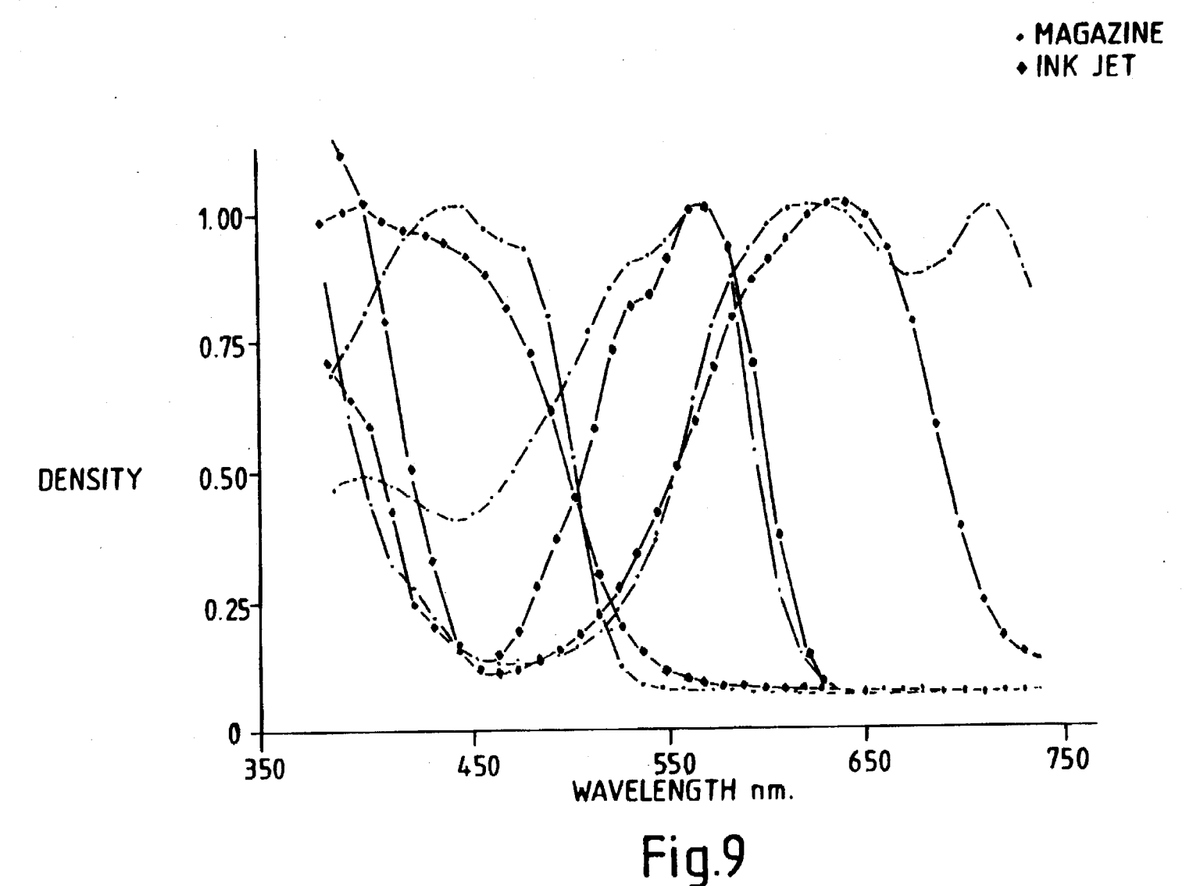
FIG. 9 illustrates dye absorbency curves for magazine pigment and ink jet dye sets.

Absorbency curves for photographic and thermal dye sets are shown in FIG. 8 and those for magazine pigments and ink jet dyes in FIG. 9. It will be readily appreciated that the absorbency curves for these print materials illustrate a sufficient diversity in the shape of the cyan curve (as is the case for transparency materials described above) for it to be possible to identify the materials only from an analysis of this curve. A technique very similar to that described above for transparency materials is used for print materials and will be described in more detail later.

Figure 10:
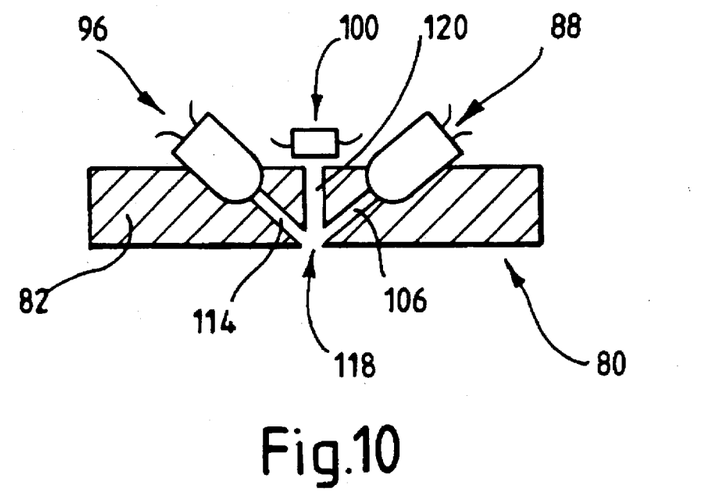
FIG. 10 illustrates a schematic side elevation of a reflection head constructed in accordance with the present invention.
Figure 11:
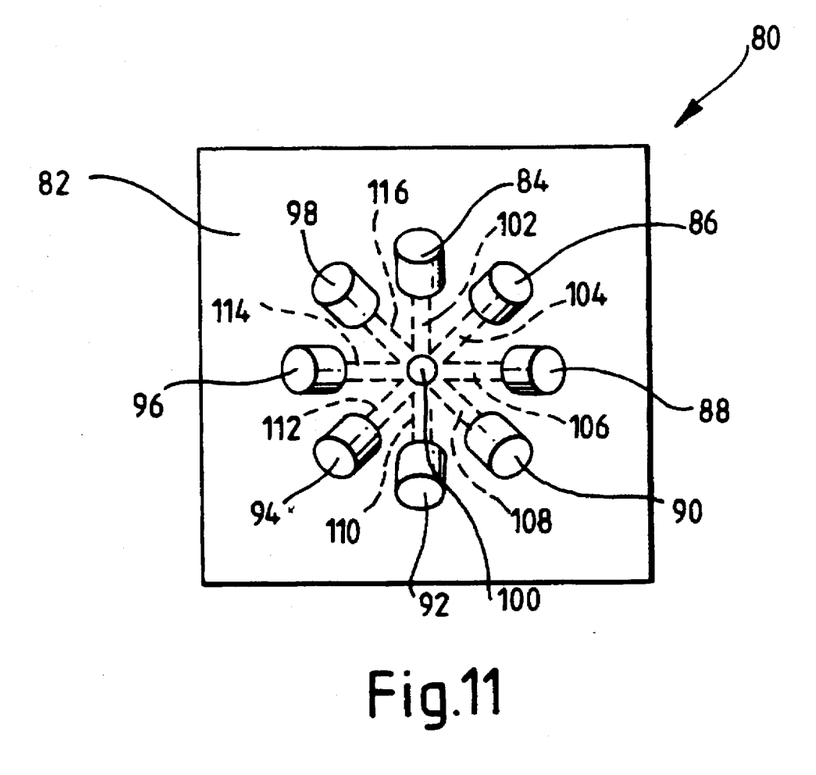
FIG. 11 is a schematic plan view of the reflection head shown in FIG. 10.

A reflection head arrangement 80 is shown schematically in FIGS. 10 and 11. The arrangement 80 comprises a block 82 in which eight LEDs 84, 86, 88, 90, 92, 94, 96, 98 are mounted. Each LED 84, 86, 88, 90, 92, 94, 96, 98 is located in the block 82 so as to provide illumination for a sample to be tested (not shown) at an angle of 45° to the sample surface. A photodiode 100 is also mounted on the block 82.

Passageways 102, 104, 106, 108, 110, 112, 114, 116 are formed in block 82 at an angle of 45° to the sample surface (not shown) and extend from a respective one of the LEDs 84, 86, 88, 90, 92, 94, 96, 98 to a central illumination point 118. A further passageway 120 is formed in the block 82 at an angle of 90° to the sample surface (not shown) and extends from the illumination point 118 to the photodiode 100 as shown in FIG. 10.

Each LED 84, 86, 88, 90, 92, 94, 96, 98 is equispaced from the illumination point 118 and from one another as shown in FIG. 11. However, it is not necessary that the LEDs be equispaced from one another provided they illuminate the sample at the illumination point at an angle of 45°.

Control means (not shown) are provided for controlling the operation of the LEDs 84, 86, 88, 90, 92, 94, 96, 98 and for processing the output from the photodiode 100 in a similar way to that described above for transparency materials.

Figure 12:
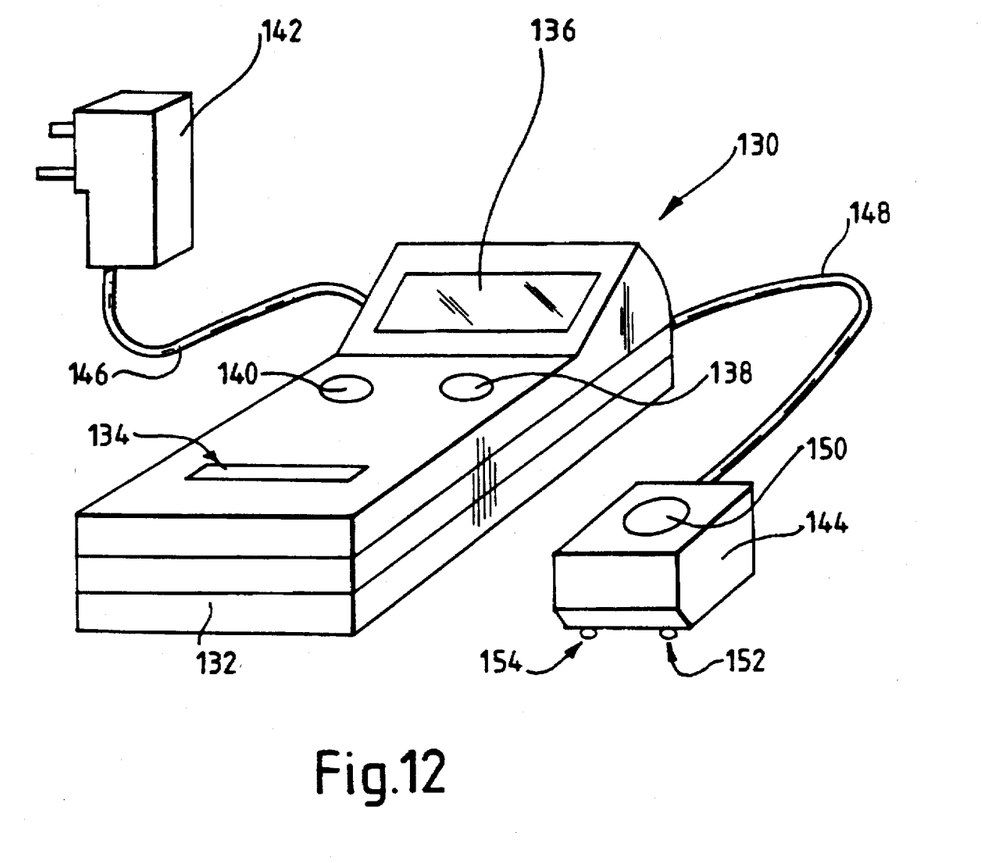
FIG. 12 shows a device incorporating a transmission arrangement for transparency materials and a reflection arrangement for print materials in accordance with the present invention.

FIG. 12 illustrates a device 130 which incorporates both transmission and reflection techniques so that both transparency and print materials can be tested. The device 130 comprises a body portion 132, which houses a mirror box arrangement in accordance with that described with reference to FIG. 5 and detector arrangement as shown in FIG. 7. A slide gate 134 is provided to position a transparency for testing. The slide gate 134 is sized to accommodate a wide range of transparency or slide thicknesses and to position the transparency or slide relative to the detectors such that no stray light reaches the detectors. This is achieved by spring-loading the transparency or slide against a back plate in which the detectors are mounted. The spacing between the transparency being measured and the detectors is not crucial as the arrangement does not form part of an imaging system, and any variations in this spacing merely affects the size of the sample area.

Additionally, the detectors may be located at the bottom of short holes formed in the back plate on which the detectors are mounted to limit the light reaching the detectors to that which only passes through the transparency or slide.

The body portion 132 also has a liquid crystal display (LCD) element 136 comprising two lines each having sixteen characters.

Slide gate sensors (not shown) similar to that shown in FIG. 5 may be located at the top and/or bottom of the gate 134 to detect if a slide has been either fully removed or fully inserted for use in open gate readings and sample readings respectively. Appropriate messages can be displayed on the element 136 (under software control) indicating correct or incorrect insertion of the transparency or slide in the gate 134.

It is preferred that two optical sensors are used, each mounted at the top and the bottom of the slide gate respectively. The bottom sensor detects when the slide is fully inserted and operates over the last millimeter of the transparency or slide movement during insertion. The top sensor checks when the slide is fully clear of the detectors so that open gate measurements can be carried out.

Preferably, the optical sensors comprise red LEDs which allows for the possibility that the mount for each transparency or slide is transparent to infra-red radiation.

The orientation of a slide can also be checked. If a slide has been inserted incorrectly, that is, so that it lies vertically rather than horizontally regardless of content, two of the detectors in the array shown in FIG. 7 will be looking at the mount and not at the transparency. This can be detected by comparing the ratio of the density at 935 nm to that at 650 nm. At 935 nm, there is little or no density on the transparency film material whereas the transparency mount will always have some density at 935 nm even if the mount is plastic.

The device 130 operates automatically in the transmission mode, that is, when testing transparencies, carrying out calibration checks and then tests on a transparency which has been inserted into the slide gate 134.

Button 138 allows for manual calibration of the device in the transmission mode (for testing transparency materials) prior to insertion of a sample and button 140 operates the device to re-test a transparency sample. These buttons 138, 140 are used to supplement the automatic operation of the device, if required.

The body portion 132 is connected to a mains adapter 142 as shown and a reflection head 144 by respective cables 146 and 148. The reflection head 144 contains a single detector with a buffer amplifier, an array of LEDs, and a switch 150. The arrangement of the detector and array of LEDs is as described with reference to FIGS. 10 and 11. The reflection head 144 is mounted on three spring-loaded legs, only two legs 152, 154 of which are visible, for stability which hold it 6 mm above a print sample to be tested (not shown).

When the head 144 is pressed downwards on to the surface of the sample (not shown) against the action of the spring-loading in the legs 152, 154, the switch 150 is operated to make a reading. The switch may be incorporated in the movement of the legs 152, 154.

Positioning of the reflection head 144 over a sample can be assisted by the illumination of one of the LEDs.

Each of the LEDs operates at the same spectral wavelength as a corresponding one in the mirror box in the body portion 132.

Before the device 130 is used to test either a transparency sample or a print sample, it is calibrated to set up the required LED current levels as is known in the art and will not be discussed further here.

Open gate values, in the transmission mode, that is, for testing of transparencies or slides, for each detector for each colour are also determined, the open gate check being carried out with no sample transparency present in the gate 134.

Similarly, open gate values in the reflection mode, that is, for testing print materials, are also determined. This is achieved by pressing the head 144 down on to a reference white surface and readings are taken for each detector.

Operation of the device 130 will now be described in more detail for each of its two modes, namely, the transmission mode for transparency materials and the reflection mode for print materials.

When comparing transparency materials, the calculation of the magenta dye for Ektachrome materials is determined from the dye absorbency curves:

$$M_m = M_d + AC_d$$

and $$C_m = C_d + BM_d$$

where $M_m$ is the density measured at the magenta dye peak, 555 nm, $M_d$ is the density of the magenta dye, $C_m$ is the density measured at the cyan dye peak, 650 nm, $C_d$ is the density of the cyan dye, A is the proportion of the cyan dye density at the magenta dye peak, and B is the proportion of the magenta dye density at the cyan dye peak.

From the two equations above, the density of the magenta dye, $M_d$, can be determined from the following:

$$M_d = \frac{M_m - AC_m}{1 - AB}$$

From FIG. 1, which shows the Ektachrome absorbency curves, A=0.22 and B=0.05 which gives a value of (1−AB) which is very close to 1. Therefore, $$M_d = M_m - AC_m$$

which gives $$M_d = M_m - 0.22 C_m$$

Using a similar calculation for Kodachrome materials, and because the cyan measurement is also very close to the dye density, the magenta dye for Kodachrome can be written as:

$$M_d = M_m - 0.09 C_m$$

The cyan dye density at 650 nm and the intermediate wavelengths of 605 nm and 585 nm can be determined by subtracting the appropriate proportion of the magenta dye density, at each wavelength to give:

For Ektachrome:

$$585_c = 585_m - 0.48 M_E$$

$$605_c = 605_m - 0.31 M_E$$

$$650_c = \frac{650_m}{0.99} - 0.05 M_E$$

For Kodachrome:

$$585_c = 585_m - 0.57 M_K$$

$$605_c = 605_m - 0.36 M_K$$

$$650_c = \frac{650_m}{0.99} - 0.1 M_K$$

where $M_E$ and $M_K$ are the magenta dye densities for Ektachrome and Kodachrome respectively and the subscripts 'c' and 'm' represent the corrected and measured values respectively as described previously.

The ratios of the cyan dye density at different wavelengths can then be calculated using both set of equations given above. The ratios of cyan dye for each sample is calculated for each of the pairs listed below:

Measured ratios:
R1=605:650
R2=690:650
and R1/R2=605:690

Cyan dye ratios:
For Ektachrome, these ratios are:
R3=605:585
R4=650:585
and R5=R2×R3

For Kodachrome, these ratios are:
R6=605:585
R7=650:585
and R8=R5×R6

Extreme values of the ratios, due to the samples being non-uniform, are rejected before an average is made. An average value is determined from all valid results and compared with stored limits to provide a decision as to the type of transparency material, that is, Ektachrome or Kodachrome. Any samples which are very different from the average are also rejected and a new average computed. Providing the number of remaining valid samples is greater than three, the averages of the ratios are then compared with the stored limits. The ratios R1 and R2 are used to augment the results from ratios on the short wavelength side of the cyan dye peak and are particularly useful in identifying pre-1975 Kodachrome materials and other old transparency film types.

Once it has been established that the sample is a colour transparency and that there is a sufficient number valid ratios, the ratios are compared with predetermined limits and for each comparison which the sample passes, it is given a score either for Ektachrome or Kodachrome. After all the checks have been made, the scores are compared and the highest score identifies the material which is then displayed on LCD 136. If the scores are the same, then an appropriate message is displayed. In such a case, there could be a default to indicate that the material is of the Ektachrome type.

The expected value for the ratios can easily be calculated, assuming line spectra output for the LEDs. However, in general, the ratios measured and the limits set are less than the curves of FIGS. 1 and 2 would indicate. This is mainly due to the error in assuming a value for the cyan dye at the centre of the LED emission peak. If the value of the cyan dye is integrated over the bandwidth of the LED emission then due to the shape of the cyan dye curve, the sample wavelength of the 585 nm LED is effectively pushed to a longer wavelength giving a higher value of cyan dye than would be indicated by the on peak measurement. This results in the measurements giving a lower value to the ratio values between the 585 nm and either the 605 nm or 650 nm than might be expected from the line calculations.

Ektachrome scores:

| Ratio | Wavelength | Expected | Main score | | Additional scores | |
|---|---|---|---|---|---|---|
| R1/R2 | 605:690 | 1.07 | >1.00 | E + 1 | >1.05 | E + 1 |
|  |  |  |  |  | >1.15 | E + 1 |
| R2 | 690:650 | 0.93 | >1.05 | E + 1 | >1.10 | E + 1 | where E is the Ektachrome score.
Cyan dye ratios:

| Ratio | Wavelength | Expected | Main score | | Additional scores | |
|---|---|---|---|---|---|---|
| R3 | 605:585 | 1.4 | <1.2 | E + 1* | <1.1 | E + 1* |
| R4 | 650:585 | 2.1 | <1.8 | E + 1* | <1.7 | E + 1* |
| R5 | R3 × R4 | 2.9 | <2.2 | E + 1* |  |  |

*Ektachrome score only incremented if R1/R2 > 0.94

Kodachrome scores:

| Ratio | Wavelength | Expected | Main score | | Additional scores | |
|---|---|---|---|---|---|---|
| R1/R2 | 605:690 | 0.98 | <0.94 | K + 1 | <0.89 | K + 1 |
|  |  |  |  |  | <0.79 | K + 1 |
| R2 | 690:650 | 0.67 | <0.90 | K + 1# | <0.85 | K + 1# |

Kodachrome score only incremented if R1/R2 < 0.96 where K is the Kodachrome score.
Cyan dye ratios:

| Ratio | Wavelength | Expected | Main score | | Additional scores | |
|---|---|---|---|---|---|---|
| R6 | 605:585 | 2.2 | >1.7 | K + 1⊛ | >1.9 | K + 1⊛ |
| R7 | 650:585 | 4.5 | >2.6 | K + 1⊛ | >2.7 | K + 1⊛ |
| R8 | R6 × R7 | 9.9 | >4.2 | K + 1⊛ |  |  |

⊛Kodachrome score only incremented if R1/R2 < 0.96

The additional conditions help to eliminate false identification of older transparency film types.

When comparing print materials, similar calculations are made to give the following equations:

$$M_d = \frac{M_m - AC_m}{1 - AB}$$

where $M_m$ is the density measured at the magenta dye peak, 555 nm, $M_d$ is the density of the magenta dye, $C_m$ is the density measured at the cyan dye peak, 650 nm, $C_d$ is the density of the cyan dye, A is the proportion of the cyan dye density at the magenta dye peak, and B is the proportion of the magenta dye density at the cyan dye peak.

From FIG. 8, the average values of A and B for thermal and photographic print materials are 0.3 and 0.15 respectively. This means that the magenta dye for these two material can be defined by:

$$M_d = 1.05 M_m - 0.32 C_m$$

This value of magenta dye can then be used to calculate the cyan dye at 585 nm, 605 nm, 650 nm and 690 nm:

$585_c = 585_m - 0.55 M_P$ $605_c = 605_m - 0.3 M_P$ $650_c = 650_m - 0.1 M_P$ $690_c = 690_m - 0.1 M_P$ where $M_P$ is the magenta dye density for thermal and photographic print materials and the subscripts 'c' and 'm' represent the corrected and measured values respectively as described previously.

For each print sample, the ratios of cyan dye at the following wavelengths:

605 nm:650 nm 690 nm:650 nm 690 nm:605 nm 585 nm:650 nm

These values are compared to stored limits to determine the material type.

For print materials, three sets of ratios are used: one from the cyan values derived using the technique described above, one using the measured density values and a third set as a ratio of the first two sets.

The expected cyan density ratios, from FIGS. 8 and 9, are:

| RATIO | | PHOTO-GRAPHIC | THERMAL | MAGAZINE | INK JET |
|---|---|---|---|---|---|
| R1 | 605:650 | 0.82 | 0.66 | 1.03 | 0.92 |
| R2 | 690:650 | 0.92 | 1.02 | 0.95 | 0.39 |
| R3 | 690:605 | 1.11 | 1.53 | 0.91 | 0.42 |
| R4 | 585:650 | 0.64 | 0.50 | 0.93 | 0.82 |

The measured density ratio, R10, is 605:650.

The ratio of cyan density to the measured density ratio are:

| R15 | 605:650 |
| R45 | 585:650 |

A similar scoring method to that used for the identification of transparency material is used, but with additional conditional stages. As before, the print material being tested is identified as the one with the highest score with a possible default to photographic if there is no highest score.

If there is no infrared density measurement, the following scoring system is utilised:

| PHOTOGRAPHIC (P) | THERMAL (T) |
|---|---|
| IF 0.66 < R1 < 0.8 AND 0.9 < R4 < 0.43 THEN P + 1 | IF R1 < 0.65 AND R10 < 0.8 THEN T + 1 |
| IF 0.45 < R4 < 0.65 THEN P + 1 | IF R3 > 1.6 AND R4 < 0.8 THEN T + 1 |
| IF 1.4 < R45 < 1.75 THEN P + 1 | IF R4 < 0.42 THEN T + 1 |
|  | IF 1.8 < R45 < 2.2 THEN T + 1 |

| MAGAZINE (M) | INK JET (I) |
|---|---|
| IF R4 > 0.8 AND R3 > 0.85 THEN M + 1 | IF R1 > 0.95 THEN I + 1 |
| IF R10 > 1.0 AND R3 > 0.85 THEN M + 1 | IF R2 < 0.6 THEN I + 1 |
| IF R1 > 0.8 AND R3 > 0.85 THEN M + 1 | IF R3 < 0.7 THEN I + 1 |
| IF 1.25 < R15 < 1.35 THEN M + 1 | IF R10 > 1.15 THEN I + 1 |
| IF 1.2 < R45 < 1.37 AND R3 > 0.7 THEN M + 1 | IF 1.01 < R45 < 1.19 AND R15 < 1.2 THEN I + 1 |

As will be readily appreciated from the above conditions, some of the cyan ratios are very similar between material types and the additional conditions differentiate between the material types.

After calibration of the device has been made, either for operation in the transmission mode (transparencies and slides) or in the reflection mode (print materials), each illuminating LED is switched on in turn and the density of each sample point in each colour is measured and stored. The stored data is then processed to calculate the level of cyan dye or pigment for each sample in each colour. After rejecting unsuitable ratios of cyan at different wavelengths, the remaining valid samples are averaged and the average is compared to predetermined values to determine the type of film or print material being evaluated.

I claim:

1. A method of identifying image-forming materials, the method comprising the steps of:

illuminating a sample of image-forming material with a radiation source operating at a plurality of wavelengths;

measuring a parameter proportional to the sample density of the material at a plurality of wavelengths between and including two adjacent peaks of dye absorbency curves for the material;

calculating the individual dye absorbencies at each wavelength;

calculating the ratios of the individual dye absorbencies; and comparing the calculated ratios with reference data to determine the type of image-forming material.

2. A method according to claim 1, wherein the image-forming material is photographic material.

3. A method according to claim 2, wherein one of the dye absorbency curves used is the cyan dye absorbency curve.

4. A method according to claim 1, wherein the image-forming material is film transparency.

5. A method according to claim 4, wherein the parameter proportional to the sample density is measured by transmission.

6. A method according to claim 1 wherein the sample is illuminated at five wavelengths.

7. A method according to claim 1, wherein the image-forming material is print material.

8. A method according to claim 7, wherein the print material is photographic.

9. A method according to claim 7, wherein the parameter proportional to the sample density is measured by reflection.

10. Apparatus for identifying image-forming materials from a sample, the apparatus comprising:

illumination means for illuminating the sample at a plurality of wavelengths;

detector means for detecting radiation received from the sample and providing an output signal proportional to the sample density of the material at a plurality of wavelengths between and including two adjacent peaks of dye absorbency curves;

processing means for calculating the individual dye absorbencies at each wavelength;

calculating the ratios of the individual dye absorbencies; and comparing the calculated ratios with reference data to determine the type of image-forming material.

11. Apparatus according to claim 10, wherein the illumination means comprise a plurality of light-emitting diodes, each producing radiation at a different wavelength.

12. Apparatus according to claim 11, wherein there are five light-emitting diodes, each producing radiation at a respective one of the following wavelengths: 555 nm, 585 nm, 605 nm, 630 nm, 660 nm.

13. Apparatus according to claim 11, wherein the light-emitting diodes are arranged in an integrating sphere.

14. Apparatus according to claim 10, wherein the detector means comprises a single detector.

15. Apparatus according to claim 11, wherein there are six light-emitting diodes, each producing radiation at a respective one of the following wavelengths: 555 nm, 585 nm, 605 nm, 650 nm, 690 nm, 935 nm.

16. Apparatus according to claim 15, wherein the light-emitting diodes are arranged in a mirror box.

17. Apparatus according to claim 16, wherein the detector means comprises a plurality of detectors arranged in an array.

18. Apparatus according to claim 17, wherein the array comprises eight detectors.

19. Apparatus according to claim 17, wherein the array comprises twelve detectors.

20. Apparatus according to claim 18, wherein the array is offset from the centre of the sample.

21. Apparatus according to claim 20, wherein the array is arranged in at least two portions, each portion being offset from the other.

* * * * *